(12) United States Patent
Kaita et al.

(10) Patent No.: US 6,730,736 B1
(45) Date of Patent: May 4, 2004

(54) ALICYCLYC STRUCTURE-CONTAINING RESIN COMPOSITION

(75) Inventors: Shojiro Kaita, Saitama (JP); Takashi Iga, Kanagawa (JP); Yasuhiro Wakizaka, Kanagawa (JP); Yasuo Tsunogae, Kanagawa (JP)

(73) Assignee: Nippon Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/647,573

(22) PCT Filed: Apr. 9, 1999

(86) PCT No.: PCT/JP99/01901

§ 371 (c)(1),
(2), (4) Date: Oct. 2, 2000

(87) PCT Pub. No.: WO99/52980

PCT Pub. Date: Oct. 21, 1999

(30) Foreign Application Priority Data

Apr. 9, 1998 (JP) .......................................... 10-114134

(51) Int. Cl.$^7$ .............................................. C08F 255/00
(52) U.S. Cl. .............................. 525/70; 525/71; 525/75; 525/80; 525/87; 525/93; 525/97; 525/210; 525/216
(58) Field of Search ............................. 525/192, 70, 71, 525/75, 80, 87, 93, 97, 210, 216

(56) References Cited

U.S. PATENT DOCUMENTS 5,414,044 A * 5/1995 Moriya et al.

FOREIGN PATENT DOCUMENTS

| JP | 51-59989 | 5/1976 |
|---|---|---|
| JP | 62-034924 | 2/1987 |
| JP | 63-043910 | 2/1988 |
| JP | 64-001706 | 1/1989 |
| JP | 64-066216 | 3/1989 |
| JP | 3-14882 | 1/1991 |
| JP | 3-45612 | 2/1991 |
| JP | 3-72558 | 3/1991 |
| JP | 3-122137 | 5/1991 |
| JP | 5-148347 | 6/1993 |
| JP | 5-239284 | 9/1993 |
| JP | 6-100744 | 4/1994 |
| JP | 6-136057 | 5/1994 |
| JP | 6-179781 | 6/1994 |
| JP | 7-258318 | 10/1995 |
| JP | 7-292181 | 11/1995 |
| JP | 9-53002 | 2/1997 |
| JP | 9-100388 | 4/1997 |
| JP | 2653707 | 5/1997 |

OTHER PUBLICATIONS

Masahiro, Caplus AN 1994:657125.*

* cited by examiner

*Primary Examiner*—Jeffrey Mullis
(74) *Attorney, Agent, or Firm*—Dinsmore & Shohl LLP

(57) ABSTRACT

An alicyclic structure-containing resin composition comprising an alicyclic structure-containing resin (A) having a polar group in a proportion of 3 to 50 mol % based on the whole repeating unit in the resin, and a soft polymer (B), a varnish containing the resin composition, a sheet formed of the resin composition, and an insulating film formed of the resin composition.

18 Claims, No Drawings

ALICYCLYC STRUCTURE-CONTAINING RESIN COMPOSITION

TECHNICAL FIELD

The present invention relates to an alicyclic structure-containing resin composition, and more particularly to an alicyclic structure-containing resin composition which is excellent in heat resistance, moisture resistance, low water absorption property, dielectric properties, adhesion property, moldability, etc., markedly improved in resistance to solvent cracking and resistance to cracking in both pressure cooker test and thermal cycle test, and suitable for use as an insulating material for electronic parts.

BACKGROUND ART

In the field of electronics mounting techniques, various kinds of resin materials are used as insulating materials such as adhesives, insulating films and sealing materials. Such resin materials are often used in the form of varnishes, sheets or the like. More specifically, these resin materials are often used as film-forming materials in electronic parts making use of thin films or thick films. In the sealing of electronic parts with resins, an injection-molding method may be adopted.

Resin materials used as insulating materials for electronic parts are required to have various properties in addition to being excellent in heat resistance, dielectric properties, etc.

First, the resin materials are required to have excellent adhesion property to other materials. A coating film obtained by coating a substrate with a varnish and drying it, a sheet laminated on a substrate or between substrates, or a resin-sealed portion is required to have excellent adhesion property to substrates, semiconductor parts and the like, and high reliability. The substrates include silicon wafer substrates, ceramic substrates, glass epoxy substrates, film substrates, etc. Besides, those obtained by forming a plating film such as copper plating, or a metal wiring on a substrate are also included. Therefore, the resin materials are also required to be excellent in adhesion property to not only these various substrates, but also plating layers and metal wirings (circuit boards).

Second, electronic parts are required to sufficiently withstand reliability tests such as pressure cooker test (PCT) and thermal cycle test (TCT), in which a severe stress is applied to a specimen, in order to reduce a failure rate and elongate a life. Therefore, the thin film, thick film or resin-sealed portion formed of a resin is required not to cause cracking in these reliability tests. When cracking occurs in the resin film or the like, the insulating performance of the electronic parts is deteriorated. In addition, the electronic parts are broken down due to the penetration of water or moisture through cracks. Further, the adhesion property of the resin film or resin-sealed portion to another material such as a semiconductor part or substrate is impaired by the occurrence of cracking.

Third, the resin materials are required to have excellent resistance to solvent cracking. When a thin film, thick film or resin-sealed portion formed of a resin material is cracked by bringing it into contact with an organic solvent, the insulating performance of such an electronic part is impaired, and moreover difficulty is encountered on the fabrication of a multi-layer board using a film-forming technique. For example, when a varnish comes into contact with an underlying resin film, and the resin film is cracked by an organic solvent component contained in the varnish, the adhesion property, insulating property and the like of the resin film are impaired, and so difficulty is encountered on the formation of a multi-layer structure by, for example, using varnishes to alternately form wiring boards and insulating resin layers.

Thermosetting resins and ultraviolet-curable resins having heretofore been used in this technical field have involved such problems that they generally have no repairing property, and any property of the heat resistance, adhesion property, moisture resistance and the like is insufficient. Many of thermoplastic resins are insufficient in adhesion property and hence difficult to satisfy reliability tests under high-temperature and high-humidity conditions.

On the other hand, alicyclic structure-containing resins such as thermoplastic norbornene resins are resin materials excellent in heat resistance, moisture resistance, low water absorption property, dielectric properties (low dielectric constant and low dielectric loss tangent), moldability and the like, and are hence used as molding materials in wide fields such as an optical field, and a medical and chemical field. If these alicyclic structure-containing resins can be applied to insulating material for electronic parts, it is expected that these various properties can be sufficiently exhibited.

However, the alicyclic structure-containing resins have involved problems that when they are used as insulating materials for electronic parts, such as adhesive materials, insulating films and sealing materials in, for example, adhesion-junction of semiconductor chips to a wiring board, sealing and insulation of electronic parts, adhesion between boards (substrates), interlayer insulation, etc., they become poor in resistance to solvent cracking, and moreover insufficient in the reliability in PCT and TCT and also in adhesion property to other materials such as substrates and plating layers.

Japanese Patent Application Laid-Open No. 148347/1993 has heretofore proposed a graft-modified thermoplastic norbornene resin obtained by graft-reacting an addition copolymer of a norbornene monomer and ethylene with an amino group-containing, ethylenically unsaturated compound. Since a polar group (amino group) is introduced into this graft-modified thermoplastic norbornene resin, the resin has been improved in the adhesion property to other materials, but insufficient in long-term reliability in PCT and TCT and resistance to solvent cracking when it is used as an insulating material for electronic-parts.

On the other hand, in order to improve mechanical properties of alicyclic structure-containing resins, such as impact resistance, there has been proposed a technique that a soft polymer such as rubber is incorporated therein. For example, (1) Japanese Patent No. 2653707 has proposed resin compositions with nylon or ethylene-propylene rubber (EPR) incorporated in a maleic anhydride-modified thermoplastic norbornene resin obtained by modifying an addition copolymer of tetracyclododecene and ethylene with maleic anhydride. The maleic anhydride-modified thermoplastic norbornene resins specifically shown in this document are resins that the modification rate with maleic anhydride is as low as about 0.6 mol % based on the whole repeating unit in the copolymer. These resin compositions are provided as molded products by injection molding. (2) Japanese Patent Application Laid-Open No. 72558/1991 discloses resin compositions with styrene rubber such as styrene-butadiene copolymer rubber incorporated into a thermoplastic norbornene resin obtained by hydrogenating a ring-opening polymer of a norbornene monomer having an ester group. These thermoplastic saturated norbornene resins have an ester group in all repeating units of the polymer.

The resin compositions disclosed in these documents (1) and (2) are all improved in mechanical properties such as impact resistance by incorporating a soft polymer such as rubber into a thermoplastic norbornene resin, and are suitable for use in the formation of various kinds of molded products by injection molding and the like. These molded products are good in impact resistance and hence have a nature that they are hard to be destroyed when external force is applied thereto.

However, these conventional alicyclic structure-containing resin compositions have been not always suitable for use as insulating materials for electronic parts. More specifically, the resin compositions described in the document (1) are insufficient in resistance to solvent cracking, and resistance to cracking in TCT due to the low rate of introduction of the polar group (maleic anhydride group) though they are excellent in moisture resistance and low water absorption property. The resin compositions described in the document (2) are high in coefficient of water absorption due to too high content of the polar group (ester group), and moreover are insufficient in resistance to cracking in PCT and resistance to solvent cracking.

As described above, the alicyclic structure-containing resins have been not always suitable for use as insulating materials for electronic parts though they have various excellent properties such as good heat resistance and dielectric properties.

DISCLOSURE OF THE INVENTION

It is an object of the present invention to provide a resin composition which is excellent in heat resistance, dielectric properties, adhesion property (adhesive property), etc., and also in resistance to solvent cracking and resistance to cracking in reliability tests such as pressure cooker test and thermal cycle test, and suitable for use as an insulating material for electronic parts.

The present inventors have carried out an extensive investigation with a view toward overcoming the above-described problems involved in the prior art. As a result, they have conceived of alicyclic structure-containing resin compositions with a soft polymer incorporated into an alicyclic structure-containing resin having a polar group in a specified proportion.

Electronic parts obtained by using an alicyclic structure-containing resin composition according to the present invention as a film-forming material or the like can sufficiently satisfy reliability tests such as PCT and TCT, and so any crack does not occur in a resin film (insulating film formed of a coating film or sheet). The film of this alicyclic structure-containing resin is excellent in resistance to solvent cracking. The resin compositions according to the present invention are also excellent in adhesion property to substrates (boards), plating layers, metal wiring, etc.

Accordingly, the alicyclic structure-containing resin compositions according to the present invention are resin materials suitable for use as insulating materials for electronic parts. The present invention has been led to completion on the basis of these findings.

According to the present invention, there is thus provided an alicyclic structure-containing resin composition comprising an alicyclic structure-containing resin (A) having a polar group in a proportion of 3 to 50 mol % based on the whole repeating unit in the resin, a soft polymer (B) and a hardening agent (C).

According to the present invention, there is also provided a varnish obtained by dissolving or dispersing the above-described alicyclic structure-containing resin composition in an organic solvent.

According to the present invention, there is further provided a sheet formed of the above-described alicyclic structure-containing resin composition.

According to the present invention, there is still further provided an insulating film formed of the above-described alicyclic structure-containing resin composition.

BEST MODE FOR CARRYING OUT THE INVENTION

1. Alicyclic Structure-containing Resin

The alicyclic structure-containing resin used in the present invention is a polymer having an alicyclic structure at its main chain and/or side chain and a polar group in a proportion of 3 to 50 mol % based on the whole repeating unit. The alicyclic structure-containing resin preferably has the alicyclic structure at its main chain from the viewpoints of mechanical strength, heat resistance and the like.

Examples of the alicyclic structure include a cycloalkane structure, a cycloalkene structure and the like. The cycloalkane structure and cycloalkene structure are preferred from the viewpoints of mechanical strength, heat resistance and the like, with the cycloalkane structure being most preferred. No particular limitation is imposed on the number of carbon atoms forming the alicyclic structure. However, it is generally 4 to 30 carbons, preferably 5 to 20 carbons, more preferably 5 to 15 carbons. Various properties such as mechanical strength, heat resistance and moldability are balanced with one another at a high level by containing the alicyclic structure in a repeating unit.

A proportion of the repeating unit having the alicyclic structure in the alicyclic structure-containing resin used in the present invention can be suitably selected as necessary for the end application intended. However, it is generally at least 30 wt. %, preferably at least 50 wt. %, more preferably at least 70 wt. %. If the proportion of the repeating unit having the alicyclic structure in the alicyclic structure-containing resin is too low, the heat resistance of the resulting alicyclic structure-containing resin becomes poor. It is hence not preferable to contain such a repeating unit in a too low proportion. No particular limitation is imposed on other repeating units than the repeating unit having the alicyclic structure in the alicyclic structure-containing resin, and they are suitably selected as necessary for the end application intended.

As specific examples of alicyclic structure-containing resin, may be mentioned (1) thermoplastic norbornene resins, (2) monocyclic cycloolefin polymers, (3) cyclic conjugated diene polymers and (4) vinyl alicyclic hydrocarbon polymers. Among these, the thermoplastic norbornene resins are preferred.

The thermoplastic norbornene resins include (i) ring-opening (co)polymers of norbornene monomer(s) or hydrogenated products thereof, (ii) addition (co)polymers of norbornene monomer(s) or hydrogenated products thereof, and (iii) addition copolymers of a norbornene monomer and a vinyl compound or hydrogenated products thereof. Of these, the ring-opening (co)polymers of the norbornene monomer(s) have carbon-carbon double bonds in their main chains and are preferably subjected to hydrogenation from the viewpoint of improving their various properties such as heat resistance and dielectric properties. The addition (co) polymers of the norbornene monomer(s) have no carbon-carbon double bond in their main chains, but may be subjected to hydrogenation, as desired, when an unsaturated bond is contained in their substituent group(s) or ring structures.

The alicyclic structure-containing resin having a polar group used in the present invention is a polymer obtained by introducing the polar group in such an alicyclic structure-containing resin as described above. Methods for introducing the polar group include (1) a method in which the polar group is introduced into an alicyclic structure-containing resin having no polar group or having a polar group in a low proportion by a modification reaction, and (2) a method in which a monomer having no polar group is copolymerized with a monomer having a polar group. These methods may be combined with each other. Among these methods, is preferred a method in which a desired polar group is introduced in a prescribed proportion by utilizing a modification reaction, such as a method of graft-reacting a polar group-containing unsaturated compound with an alicyclic structure-containing resin.

No particular limitation is imposed on the kind of the polar group, and examples thereof include various kinds of polar groups capable of enhancing the adhesion property to substrates (boards), plating layers, etc. More specifically, examples thereof include heteroatoms and heteroatom-containing atomic groups. Examples of the heteroatoms include oxygen, nitrogen, sulfur, silicon and halogen atoms. Of these, the oxygen and nitrogen atoms are preferred from the viewpoint of adhesion property. Specific examples of the polar groups include carboxyl, carbonyloxycarbonyl, epoxy, hydroxyl, oxy, ester, silanol, silyl, amino, nitrile and sulfone groups. Of these, the carboxyl, carbonyloxycarbonyl and epoxy groups are preferred because they have an excellent effect of improving adhesion property and are capable of easily undergoing a hardening reaction with a hardening agent to enhance crosslinking density.

The alicyclic structure-containing resin, the method for introducing the polar group and the alicyclic structure-containing resin having the polar group will hereinafter be described in more detail.

(1) Thermoplastic Norbornene Resin:

No particular limitation is imposed on the thermoplastic norbornene resin, and various kinds of norbornene polymers obtained by polymerizing a norbornene monomer or copolymerizing a norbornene monomer and a monomer copolymerizable therewith in accordance with, for example, the process disclosed in Japanese Patent Application Laid-Open No. 14882/1991 or 122137/1991 and hydrogenating the resultant polymer after the (co)polymerization as needed are used.

More specifically, examples of the thermoplastic norbornene resin used in the present invention include ring-opening (co)polymers of norbornene monomer(s), addition (co)polymers of norbornene monomer(s), addition copolymers of a norbornene monomer and a vinyl compound, and hydrogenated products thereof. Among these, the hydrogenated products of the ring-opening (co)polymers of the norbornene monomer(s), the addition (co)polymers of the norbornene monomers, and the addition copolymers of the norbornene monomer and the vinyl compound copolymerizable therewith are preferred from the viewpoint of balancing the heat resistance and dielectric properties of the resulting resins with each other at a high level, with the hydrogenated products of the ring-opening (co)polymers of the norbornene monomer(s) being particularly preferred.

Examples of the norbornene monomer include norbornene monomers having no polar group, such as bicyclo[2.2.1]hept-2-ene (trivial name: norbornene), 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-butyl-bicyclo[2.2.1]hept-2-ene, 5-ethylidene-bicyclo-[2.2.1]hept-2-ene, 5-hexyl-bicyclo[2.2.1]hept-2-ene, 5-octyl-bicyclo-[2.2.1]hept-2-ene, 5-octadecyl-bicyclo[2.2.1]hept-2-ene, 5-ethylidene-bicyclo[2.2.1]hept-2-ene, 5-methylidene-bicyclo[2.2.1]hept-2-ene, 5-vinylbicyclo[2.2.1]hept-2-ene, 5-propenyl-bicyclo[2.2.1]hept-2-ene, tricyclo[4.3.1$^{2.5}$.0$^{1.6}$]dec-3,7-diene (trivial name: dicyclopentadiene), tricyclo[4.3.1$^{2.5}$.0$^{1.6}$]undec-3,8-diene, tricyclo[4.3.1$^{2.5}$.0$^{1.6}$]undec-3-ene, 5-cyclopentyl-bicyclo-[2.2.1]hept-2-ene, 5-cyclohexyl-bicyclo[2.2.1]hept-2-ene, 5-cyclohexenyl-bicyclo[2.2.1]hept-2-ene, 5-phenylbicyclo[2.2.1]hept-2-ene, tetracyclo[4.4.1$^{2.5}$.1$^{7.10}$.0]dodec-3-ene (trivial name: tetracyclododecene), 8-methyl-tetracyclo[4.4.1$^{2.5}$.1$^{7.10}$.0]dodec-3-ene, 8-ethyltetracyclo-[4.4.1$^{2.5}$.1$^{7.10}$.0]dodec-3-ene, 8-methylidenetetracyclo-[4.4.1$^{2.5}$.1$^{7.10}$.0]dodec-3-ene, 8-ethylidenetetracyclo-[4.4.1$^{2.5}$.1$^{7.10}$.0]dodec-3-ene, 8-vinyltetracyclo-[4.4.1.$^{2.5}$.1$^{7.10}$.0]dodec-3-ene, 8-propenyltetracyclo-[4.4.1$^{2.5}$.1$^{7.10}$.0]dodec-3-ene, 8-cyclopentyltetracyclo-[4.4.1$^{2.5}$.1$^{7.10}$.0]dodec-3-ene, 8-cyclohexyltetracyclo-[4.4.1$^{2.5}$.1$^{7.10}$.0]dodec-3-ene, 8-cyclohexenyltetracyclo-[4.4.1$^{2.5}$.1$^{7.10}$.0]dodec-3-ene, 8-phenyl-cyclopentyl-tetracyclo[4.4.1$^{2.5}$.1$^{7.10}$.0]dodec-3-ene, tetracyclo-[7.4.1$^{10.13}$.0$^{1.9}$.0$^{2.7}$]tridec-2,4,6,11-tetraene (trivial name: 1,4-methano-1,4,4a,9a-tetrafluorene), tetracyclo-[8.4.1$^{11.14}$.01.10.0$^{3.8}$]tetradec-3,5,7,12-tetraene (trivial name: 1,4-methano-1,4,4a,5,10,10a-hexahydroanthracene), pentacyclo[6.5.1$^{1.8}$.1$^{3.6}$.0$^{2.7}$.0$^{9.13}$]pentadec-3,10-diene, pentacyclo[7.4.1$^{3.6}$.1$^{10.13}$.0$^{1.9}$.0$^{2.7}$]pentadec-4,11-diene, adducts of cyclopentadiene not lower than a tetramer, 5-phenylbicyclo[2.2.1]hept-2-ene, tetracyclo-[6.5.1$^{2.5}$.0$^{1.6}$.0$^{8.13}$]tridec-3,8,10,12-tetraene (trivial name: 1,4-methano-1,4,4a,9a-tetrahydrofluorene) and tetracyclo-[6.6.1$^{2.5}$.0$^{1.6}$.0$^{8.13}$]tetradec-3,8,10,12-tetraene (trivial name: 1,4-methano-1,4,4a,5,10,10a-hexahydroanthracene).

The norbornene monomer may have a polar group. A norbornene monomer having a polar group can be used as a copolymerization component (comonomer), thereby obtaining a thermoplastic norbornene resin, in which the polar group has been introduced in a prescribed proportion, without using any modification reaction.

Specific examples of the norbornene monomer having the polar group include 5-methoxycarbonyl-bicyclo-[2.2.1]hept-2-ene, 5-cyano-bicyclo[2.2.1]hept-2-ene, 5-methyl-5-methoxycarbonylbicyclo[2.2.1]hept-2-ene, 5-methoxycarbonylbicyclo[2.2.1]hept-2-ene, 5-ethoxycarbonylbicyclo[2.2.1]hept-2-ene, 5-methyl-5-methoxycarbonylbicyclo[2.2.1]hept-2-ene, 5-methyl-5-ethoxycarbonylbicyclo[2.2.1]hept-2-ene, bicyclo[2.2.1]hept-5-enyl-2-methylpropionate, bicyclo[2.2.1]hept-5-enyl-2-methyloctanoate, bicyclo[2.2.1]hept-2-ene-5,6-dicarboxylic acid anhydride, 5-hydroxymethyl-bicyclo-[2.2.1]hept-2-ene, 5,6-di(hydroxymethyl)-bicyclo-[2.2.1]hept-2-ene, 5-hydroxyisopropyl-bicyclo[2.2.1]hept-2-ene, 5,6-dicarboxy-bicyclo[2.2.1]hept-2-ene, 5-cyano-bicyclo[2.2.1]hept-2-ene, bicyclo[2.2.1]hept-2-ene-5,6-dicarboxylic acid imide, 8-methoxycarbonyl-tetracyclo-[4.4.1$^{2.5}$.1$^{7.10}$.0]-dodec-3-ene, 8-methyl-8-methoxycarbonyl-tetracyclo[4.4.1$^{2.5}$.1$^{7.10}$.0]-dodec-3-ene, 8-hydroxymethyl-tetracyclo[4.4.1$^{2.5}$.1$^{7.10}$.0]-dodec-3-ene and 8-carboxy-tetracyclo[4.4.1$^{2.5}$.1$^{7.10}$.0]-dodec-3-ene.

These norbornene monomers may be used either singly or in any combination thereof. The content of bound norbornene monomer units in the norbornene polymer is suitably selected as necessary for the end application intended. However, it is generally at least 30 wt. %, preferably at least 50 wt. %, more preferably at least 70 wt. %, whereby the mechanical strength and heat resistance of such a polymer are balanced with each other at a high level.

Examples of the copolymerizable vinyl monomer include ethylenes or α-olefins having 2 to 20 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene; cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene; non-conjugated dienes such as 1,4-hexadiene, 4-methyl-1,4-hexadiene, 5-methyl-1,4-hexadiene and 1,7-octadiene; and styrene and derivatives thereof such as styrene, α-methylstyrene, p-methylstyrene, p-chlorostyrene and vinylnaphthalene. These vinyl compounds may be used either singly or in any combination thereof.

No particular limitation is imposed on the polymerization process of the norbornene monomer, or the norbornene monomer and the vinyl compound copolymerizable therewith, and a hydrogenation process. The polymerization and hydrogenation may be conducted in accordance with any publicly-known processes.

The ring-opening (co)polymer of the norbornene monomer(s) can be obtained by subjecting at least one norbornene monomer to ring-opening (co)polymerization at a polymerization temperature of generally −50° C. to 100° C. under polymerization pressure of generally 0 to 50 kg/cm$^2$ in a solvent or without using any solvent using, as a ring-opening polymerization catalyst, a catalyst system composed of a halide, nitrate or acetylacetone compound of a metal such as ruthenium, rhodium, palladium, osmium, iridium or platinum, and a reducing agent, or a catalyst system composed of a halide or acetylacetone compound of a metal such as titanium, vanadium, zirconium, tungsten or molybdenum, and an organoaluminum compound. A third component such as molecular oxygen, alcohol, ether, peroxide, carboxylic acid, acid anhydride, acid chloride, ester, ketone, nitrogen-containing compound, sulfur-containing compound, halogen-containing compound, molecular iodine or another Lewis acid can be added to the catalyst system to improve polymerization activity and selectivity of ring-opening polymerization.

The addition (co)polymer of the norbornene monomer(s), or the addition copolymer of the norbornene monomer and the vinyl compound can be obtained in accordance with, for example, a process comprising (co)polymerizing the monomer component(s) at a polymerization temperature of generally −50° C. to 100° C. under polymerization pressure of generally 0 to 50 kg/cm$^2$ in a solvent or without using any solvent in the presence of a catalyst system composed of a vanadium compound and an organoaluminum compound.

The hydrogenated norbornene polymer can be obtained by hydrogenating a norbornene polymer having carbon-carbon unsaturated bonds, such as an ring-opening (co) polymer, with hydrogen in the presence of a hydrogenation catalyst in accordance with a method known per se in the art. Examples of the hydrogenation catalyst include heterogeneous catalysts with palladium, a nickel compound or the like carried on a support such as alumina or silica. The rate of hydrogenation is generally at least 50%, preferably at least 70%, more preferably at least 90%, whereby a hydrogenated product excellent in heat resistance and the like can be provided.

(2) Monocyclic Cycloolefin Polymer:

As the monocyclic cycloolefin polymer, may be used, for example, an addition polymer of a monocyclic cycloolefin monomer such as cyclohexene, cycloheptene or cyclooctene, which is disclosed in Japanese Patent Application Laid-Open No. 66216/1989.

(3) Cyclic Conjugated Diene Polymer:

As the cyclic conjugated diene polymer, may be used, for example, a polymer obtained by subjecting a cyclic conjugated diene such as cyclopentadiene or cyclohexadiene to 1,2- or 1,4- addition polymerization, or a hydrogenated product thereof, which is disclosed in Japanese Patent Application Laid-Open No. 136057/1994 or 258318/1995.

(4) Vinyl Alicyclic Hydrocarbon Polymer:

As the vinyl cyclic hydrocarbon polymer, may be used, for example, a polymer of a vinyl cyclic hydrocarbon monomer such as vinylcyclohexene or vinylcyclohexane, or a hydrogenated product thereof, which is disclosed in Japanese Patent Application Laid-Open No. 59989/1976, or a polymer of a vinyl aromatic monomer such as styrene or amethylstyrene, or a hydrogenated product thereof, which is disclosed in Japanese Patent Application Laid-Open No. 43910/1988 or 1706/1989.

As the alicyclic structure-containing resin having the polar group, may also be used a copolymer of a monomer having the polar group and a monomer having no polar group. However, the alicyclic structure-containing resin, in which the polar group has been introduced by a modification reaction, is preferred. The reason for it is that a polar group having high reactivity to a hardening agent, which will be described subsequently, can be easily introduced into the resin in a desired modification rate according to the modification reaction. In particular, in the case where a hardening agent, which forms an ion by heat to conduct ionic crosslinking, is used, a polar group, which can easily reacts with the hardening agent to enhance crosslinking density, can be introduced into the resin at a high modification rate by the modification reaction. Specific examples of the polar group are as described above.

No particular limitation is imposed on the method for introducing the polar group by the modification reaction. As examples thereof, may be mentioned modification reactions such as chlorination, chlorosulfonation, epoxidation of unsaturated bonds with an epoxidizing agent and graft reaction with a polar group-containing unsaturated compound. Of these, the method, in which the polar group-containing unsaturated compound is graft-reacted, is preferred.

Examples of the polar group-containing unsaturated compound include unsaturated epoxy compounds such as glycidyl acrylate, glycidyl methacrylate, glycidyl p-styrylcarboxylate, endo-cis-bicyclo[2,2,1]hept-5-ene-2,3-dicarboxylic acid, endo-cis-bicyclo[2,2,1]hept-5-ene-2-methyl-2,3-dicarboxylic acid, allyl glycidyl ether, 2-methylallyl glycidyl ether, glycidyl ether of oallylphenol, glycidyl ether of m-allylphenol, glycidyl ether of p-allylphenol: unsaturated carboxylic compounds such as acrylic acid, methacrylic acid, α-ethylacrylic acid, maleic acid, fumaric acid, itaconic acid, endo-cis-bicyclo[2,2,1]hept-5-ene-2,3-dicarboxylic acid and methyl-endo-cis-bicyclo[2,2,1]hept-5-ene-2,3-dicarboxylic acid; unsaturated carboxylic acid anhydride compounds such as maleic anhydride, chloromaleic anhydride, butenylsuccinic anhydride, tetrahydrophthalic anhydride and citraconic anhydride; unsaturated ester compounds such as monomethyl maleate, dimethyl maleate and glycidyl maleate; unsaturated alcohol compounds such as allyl alcohol, 2-allyl-6-methoxyphenol, 4-allyloxy-2-hydroxybenzophenone, 3-allyloxy-1,2-propanediol, 2-allyldiphenol, 3-buten-1-ol, 4-penten-1-ol and 5-hexen-1-ol; and unsaturated silane compounds such as chlorodimethylvinylsilane, trimethylsilylacetylene, 5-trimethylsilyl-1,3-cyclopentadiene, 3-trimethylsilylallyl alcohol, trimethylsilyl methacrylate, 1-trimethylsilyloxy-1,3-butadiene, 1-trimethylsilyloxy-cyclopentene, 2-trimethylsilyloxyethyl methacrylate, 2-trimethylsilyloxyfuran, 2-trimethylsilyloxypropene, allyloxy-t-butyldimethylsilane and allyloxytrimethyl-silane. Of these, the unsaturated epoxy compounds and unsaturated carboxylic acid anhydride compounds are particularly preferred from the viewpoints of the enhancement of modification rate and reactivity to the hardening agent.

In order to efficiently graft-copolymerize the polar group-containing unsaturated compound with the alicyclic structure-containing resin, it is generally preferable to carry out a reaction in the presence of a radical initiator. As the radical initiator, may be preferably used, for example, an organic peroxide or organic perester.

As specific examples of such a radical initiator, may be mentioned benzoyl peroxide, dichlorobenzoyl peroxide, dicumyl peroxide, di-tert-butyl peroxide, 2,5-dimethyl- 2,5-di(peroxidobenzoate)hexyne-3, 1,4-bis(tert-butyl peroxyisopropyl)benzene, lauroyl peroxide, tertbutyl peracetate, 2,5-dimethyl-2,5-di(tert-butyl peroxy)hexyne-3, 2,5-dimethyl-2,5-di(tert-butyl peroxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate. Further, an azo compound may also be used as the radical initiator. As specific examples of the azo compound, may be mentioned azobisisobutyronitrile and dimethyl azoisobutyrate.

These radical initiators may be used either singly or in any combination thereof. A proportion of the radical initiator used is generally within a range of 0.001 to 30 parts by weight, preferably 0.01 to 20 parts by weight per 100 parts by weight of the unmodified alicyclic structure-containing resin. No particular limitation is imposed on the graft-modifying reaction, and the reaction may be carried out in accordance with a method known per se in the art. The reaction is conducted at a temperature of generally 0 to 400° C., preferably 60 to 350° C. The reaction time is generally within a range of 1 minute to 24 hours, preferably 30 minutes to 10 hours.

The alicyclic structure-containing resin having a hydroxyl or carboxyl group can also be obtained by graft-modifying the unsaturated epoxy compound, unsaturated carboxylic anhydride compound or unsaturated ester compound and then following (a) a process comprising reacting an active hydrogen-containing compound with the modified product or (b) a process comprising reacting an alkali metal salt or alkaline earth metal salt of an active hydrogen-containing compound with the modified product and then hydrolyzing the reaction product.

A proportion of the polar group in the alicyclic structure-containing resin having the polar group is 3 to 50 mol %, preferably 5 to 50 mol %, more preferably 15 to 45 mol % based on the whole repeating unit of the polymer.

When a polymer, in which a polar group has been introduced by a modification reaction, is used as a soft polymer, a resin composition good in resistance to solvent cracking and resistance to cracking in PCT and TCT can be obtained even when the proportion of the polar group in the alicyclic structure-containing resin having the polar group is relatively low. However, it is generally preferred that the proportion of the polar group be relatively high within the above range from the viewpoint of exhibiting the various properties as an insulating material. If the proportion of the polar group in the alicyclic structure-containing resin is too low, the adhesion property of the resulting resin composition to circuit boards and the like becomes insufficient, the resistance to solvent cracking and resistance to cracking in TCT are also liable to become insufficient, and moreover the compatibility with the soft polymer (particularly, the soft polymer modified with a polar group) is deteriorated. If the proportion of the polar group in the alicyclic structure-containing resin is too high, the moisture resistance and resistance to water absorption of the resulting resin composition are deteriorated, and the resistance to cracking in PCT and resistance to solvent cracking are also liable to become insufficient.

The proportion of the polar group can be controlled within the desired range by controlling a copolymerizing proportion of a monomer having the polar group when the monomer having the polar group is used. In the case of the modification reaction, the proportion of the polar group introduced can be controlled by the modification rate upon the modification reaction with the polar group-containing unsaturated compound or the like. The rate of graft modification is represented by the following equation (1):

$$\text{Rate of graft modification (mol \%)}=(X/Y)\times100 \quad (1)$$

Wherein
  X: the total number of moles of the polar group in the polymer grafted by the unsaturated compound; and
  Y: the total number of monomer units in the polymer.

X is the total number of moles of modifying residue introduced by the graft monomer and can be determined by $^1$H-NMR. Y is equal to (the weight average molecular weight (Mw) of the polymer/the molecular weight of the monomer). In the case of the copolymerization, the molecular weight of the monomer is expressed by an average molecular weight of the monomer.

The molecular weight of the alicyclic structure-containing resin having the polar group used in the present invention is suitably selected as necessary for the end application intended, but is generally 1,000 to 1,000,000, preferably 2,000 to 800,000, more preferably 5,000 to 500,000, particularly preferably 8,000 to 400,000 when expressed by a number average molecular weight in terms of polystyrene as determined in the form of a cyclohexane solution by gel permeation chromatography. When the resin is not dissolved in cyclohexane, a solvent, in which the resin is dissolved, may be optionally selected from among toluene, tetrahydrofuran, chloroform, etc. to conduct the molecular weight determination. If the number average molecular weight of the alicyclic structure-containing resin having the polar group is extremely low, the long-term reliability of the resulting resin composition is deteriorated. It is hence not preferable to use any resin having such an extremely low molecular weight. If the number average molecular weight of the alicyclic structure-containing resin having the polar group is extremely high, the adhesion property of the resulting resin composition to circuit boards and semiconductor chips having fine irregularities. When the number average molecular weight falls within the above range, the resistance to solvent cracking and resistance to cracking in PCT and TCT of the resulting resin composition become excellent, and so such a polymer is preferred.

The glass transition temperature (Tg) of the alicyclic structure-containing resin having the polar group used in the present invention may be suitably selected as necessary for the end application intended. However, it is preferably at least 50° C. viewed from the service environment of electronic parts. The glass transition temperature of the resin is preferably 50 to 400° C., more preferably 100 to 300° C., particularly preferably 120 to 250° C. The resin preferably has a high glass transition temperature because the heat resistance, resistance to solvent cracking and resistance to cracking in PCT and TCT of the resulting resin composition become excellent.

2. Soft Polymer

The soft polymer used in the present invention is a polymer having a glass transition temperature (Tg) of generally at most 30° C., preferably at most 10° C., more preferably at most ° C. Such a soft polymer is a polymer having such an amorphous (noncrystalline) domain as has a nature that it is easily deformed by applying a certain stress at room temperature, but recovered to its original form by removing the stress, i.e., rubber elasticity. A polymer having plural Tgs or a polymer having both Tg and a melting point (Tm) is also included in the soft polymer so far as its lowest Tg is at most 30° C., preferably at most 10° C., more preferably at most ° C. The lower limit of Tg in the soft polymer is about −130° C., often about −125° C.

Good resistance to solvent cracking and resistance to cracking in PCT and TCT can be imparted to the alicyclic structure-containing resin by incorporating the soft polymer into the resin.

As examples of such a soft polymer, may be mentioned (a) olefin-based polymers composed mainly of an α-olefin such as ethylene or propylene, (b) isobutylene-based polymers composed mainly of isobutylene, (c) diene-based polymers composed mainly of a conjugated diene such as butadiene or isoprene, (d) cycloolefin-based polymers composed mainly of a cycloolefin such as norbornene or cyclopentene, (e) organosiloxane polymers having silicon-oxygen linkages as skeleton, (f) α,β-unsaturated acid derivative-based polymers composed mainly of an a,unsaturated acid and a derivative thereof, (g) unsaturated alcohol derivative-based polymers, (h) epoxy compound-based polymers, and (i) natural polymers such as natural rubber. These soft polymers may be used either singly or in any combination thereof.

As specific examples of the soft polymers, may be mentioned (a) olefin-based polymers such as liquid polyethylene, atactic polypropylene and homopolymers of an α-olefin such as 1-butene, 4-methyl-1-butene, 1-hexene, 1-octene or 1-decene; and copolymers such as ethylene.α-olefin copolymers, propylene.α-olefin copolymers, ethylene.propylene.diene terpolymers (EPDMs), ethylene.cycloolefin copolymers and ethylene.propylene.styrene copolymers, (b) isobutyrene-based polymers such as polyisobutylene, isobutylene.isoprene copolymer rubber and isobutylene.styrene copolymer rubber, (c) diene-based polymers such as homopolymers of a conjugated diene, such as polybutadiene and polyisoprene; conjugated diene-based random copolymers such as butadiene.styrene random copolymers, isoprene.styrene random copolymers, acrylonitrile.butadiene copolymers, hydrogenated products of acrylonitrile.butadiene copolymers and acrylonitrile.butadiene.styrene terpolymers; and block copolymers of a conjugated diene and an aromatic vinyl compound, such as butadiene.styrene block copolymers, styrene.butadiene.styrene block copolymers, isoprene.styrene block copolymers and styrene.isoprene.styrene block copolymers, and hydrogenated products thereof; (d) cycloolefin-based polymers such as metathesis ring-opening polymers of a norbornene-monomer such as norbornene, vinylnorbornene or ethylidenenorbornene, and hydrogenated products thereof; and metathesis ring-opening polymers of a monocycloolefin such as cyclobutene, cyclopentene or cyclooctene, and hydrogenated products thereof, (e) organosiloxane polymers such as silicone rubbers such as dimethyl polysiloxane, diphenyl polysiloxane and dihydroxy polysiloxane, (f) α,β-unsaturated acid derivative-based polymers such as homopolymers of an acrylic monomer, such as polybutyl acrylate, polybutyl methacrylate, polyhydroxyethyl methacrylate, polyacrylamide and polyacrylonitrile; and copolymers of an acrylic monomer and another monomer, such as butyl acrylate-styrene copolymers, (g) unsaturated alcohol derivative-based polymers such as homopolymers of an (esterified) unsaturated alcohol, such as polyvinyl alcohol, polyvinyl acetate, polyvinyl stearate, polyvinyl benzoate and polyvinyl maleate; and copolymers of an (esterified) unsaturated alcohol and another monomer, such as vinyl acetate-styrene copolymers, (h) epoxy compound-based polymers such as polyethylene oxide, polypropylene oxide and epichlorohydrin rubber, and (i) natural polymers such as natural rubber, polypeptide and proteins.

These soft polymers may have a crosslinked structure or may be modified by introducing a polar group.

Among the above-described soft polymers, the soft polymers (a), (b) and (c) are preferred because they are excellent in rubber elasticity and also in mechanical strength and flexibility.

Among these soft polymers (a), (b) and (c), copolymers having an aromatic vinyl monomer unit are more preferred because they are excellent in heat resistance and compatibility. Examples of such copolymers include random copolymers such as ethylene-propylene-styrene terpolymers and isobutylene.styrene copolymer, and hydrogenated products thereof; and block copolymers such as butadiene.styrene block copolymers, styrene.butadiene.styrene block copolymers, isoprene.styrene block copolymers and styrene.isoprene.styrene block copolymers, and hydrogenated products thereof. Of these, polymers containing no or little double bond in their main chains are still more preferred from the viewpoints of heat resistance and weather resistance. Examples of such polymers include hydrogenated butadiene.styrene block copolymers, hydrogenated styrene.butadiene.styrene block copolymers, hydrogenated isoprene.styrene block copolymers, hydrogenated styrene.isoprene.styrene block copolymers, hydrogenated butadiene.styrene random copolymers and hydrogenated isoprene.styrene random copolymers.

The soft polymer used in the present invention preferably has a polar group. The soft polymer having the polar group is excellent in compatibility with the alicyclic structure-containing resin having the polar group and makes it possible to still more enhance the resistance to solvent cracking and resistance to cracking in PCT and TCT of the resin by finely dispersing it in the resin. No particular limitation is imposed on the kind of the polar group. However, a polar group capable of enhancing adhesion property at a microdomain interface formed upon finely dispersing the soft polymer in the alicyclic structure-containing resin having the polar group is preferred, with a polar group capable of forming interaction such as chemical bonding or hydrogen bonding with the polar group contained in the alicyclic structure-containing resin being more preferred.

Specific examples of the polar groups include carboxyl, carbonyloxycarbonyl, epoxy, hydroxyl, oxy, ester, silanol, silyl, amino, nitrile and sulfone groups. Any of these polar groups can be selected according to the polar group contained in the alicyclic structure-containing resin. However, as a polar group capable of forming strong interaction, the carboxyl or carbonyloxycarbonyl group is preferred.

Methods for introducing the polar group into the soft polymer include a method in which a monomer having the polar group is copolymerized, and a method in which the polar group is introduced by a modification reaction. Of these, the method, in which the polar group is introduced into the soft polymer by a modification reaction, is preferred in that a desired polar group is easily introduced.

As the modification reaction, a process comprising graft-reacting a polar group-containing unsaturated compound is preferred. An example of the modification by the graft reacting includes a process comprising reacting an unsaturated carboxylic acid, unsaturated carboxylic acid anhydride, unsaturated alcohol, unsaturated epoxy compound or unsaturated silane compound in the presence of a radical initiator. These modification reaction, polar group-containing unsaturated compound used in the modification reaction, and radical initiator are the same as in the preparation process of the alicyclic structure-containing resin having the polar group.

Specific examples of the soft polymer, in which the polar group has been introduced by the modification reaction, include maleic acid-modified products of the hydrogenated butadiene.styrene block copolymers, hydrogenated styrene.butadiene.styrene block copolymers, hydrogenated isoprene.styrene block copolymers, hydrogenated styrene.isoprene.styrene block copolymers, hydrogenated butadiene.styrene random copolymers and hydrogenated isoprene.styrene random copolymers. Of these, the maleic acid-modified, hydrogenated butadiene.styrene block copolymers, maleic acid-modified, hydrogenated styrene.butadiene.styrene block copolymers, maleic acid-modified, hydrogenated isoprene.styrene block copolymers and maleic acid-modified, hydrogenated styrene.isoprene.styrene block copolymers are particularly preferred.

Besides, soft polymers modified with the above-described polar group-containing unsaturated compounds, such as silyl-modified products such as silyl-modified ethylene.propylene copolymers and silyl-modified ethylene.propylene.styrene terpolymers; epoxy-modified products; and unsaturated alcohol-modified products may be mentioned. The soft polymer intended to be modified is preferably a copolymer having the aromatic vinyl compound units.

A content of the polar group in the soft polymer having the polar group is generally 0.1 to 100 mol %, preferably 0.2 to 50 mol %, more preferably 0.3 to 20 mol % based on the repeating units of the soft polymer.

The molecular weight of the soft polymer (including a soft polymer having a polar group) used in the present invention is suitably selected as necessary for the end application intended, but is generally 1,000 to 1,000,000, preferably 5,000 to 500,000, more preferably 10,000 to 200,000 when expressed by a weight average molecular weight in terms of polystyrene as determined by gel permeation chromatography. When the weight average molecular weight of the soft polymer falls within the above range, the mechanical strength and flexibility of the resulting alicyclic structure-containing resin composition become excellent, and so such a soft polymer is preferred.

A proportion of the soft polymer incorporated in the present invention is generally 0.1 to 100 parts by weight, preferably 0.5 to 50 parts by weight, more preferably 1 to 30 parts by weight per 100 parts by weight of the alicyclic structure-containing resin having the polar group. When the proportion of the soft polymer incorporated falls within the above range, the resistance to cracking and resistance to solvent cracking of the resulting resin composition become excellent. It is hence preferable to incorporate the soft polymer in such a proportion.

3. Hardening Agent

A hardening agent is preferably incorporated in the alicyclic structure-containing resin composition according to the present invention in order to further improve the resistance to cracking, resistance to solvent cracking, heat resistance and solvent resistance thereof.

The kinds of the hardening agent include (1) a hardening agent which generates a radical by heat or light and (2) a hardening agent which forms an ion by heat or light. Of these, the hardening agent which forms an ion by heat or light is preferred in that an alicyclic structure-containing resin composition having enhanced crosslinking density and excellent resistance to cracking, resistance to solvent cracking, heat resistance and solvent resistance is easy to provide. The hardening agent which forms an ion by heat or light is also preferred in that hardening can be performed at a relatively low temperature.

Examples of the hardening agent which generates a radical by heat or light include organic peroxides such a methyl ethyl ketone peroxide, cyclohexanone peroxide, 1,1-bis(t-butyl peroxy)-3,3,5-trimethylcyclohexane, 2,2-bis(t-butyl peroxy)butane, t-butyl hydroperoxide, 2,5-dimethylhexane-2,5-dihydroperoxide, dicumyl peroxide, 2,5-dimethyl-2,5-di(t-butyl peroxy)hexyne-3, α,α'-bis(t-butyl peroxy-m-isopropyl)benzene, octanoyl peroxide, isobutyryl peroxide and peroxydicarbonate.

Examples of the hardening agent which forms an ion by heat or light include aliphatic polyamines such as hexamethylenediamine, triethylenetetramine, diethylenetriamine and tetraethylenepentamine; alicyclic polyamines such as diaminocyclohexane, 3(4),8(9)-bis(aminomethyl)tricyclo[5,2,1,0$^{2,6}$]decane, 1,3-(diaminomethyl)cyclohexane, menthenediamine, isophoronediamine-N-aminoethylpiperazine, bis(4-amino-3-methylcyclohexyl)methane and bis(4-aminocyclohexyl)-methane; aromatic polyamines such as 4,4'-diaminodiphenyl ether, 4,4'-diaminodiphenylmethane, α,α'-bis(4-aminophenyl)-1,3-diisopropylbenzene, α,α'-bis(4-aminophenyl)1,4-diisopropylbenzene, 4,4'-diaminodiphenyl sulfone, m-phenylenediamine and m-xylylenediamine; bisazides such as 4,4'-bisazidobenzal(4-methyl)cyclohexanone, 4,4'-diazido-chalcone, 2,6-bis(4'-azidobenzal)cyclohexanone, 2,6-bis-(4'-azidobenzal)-4-methylcyclohexanone, 4,4'-diazido-diphenyl sulfone, 4,4'-diazidodiphenylmethane and 2,2'-diazidostilbene; acid anhydrides such as phthalic anhydride, pyromellitic anhydride, benzophenonetetracarboxylic acid anhydride, nadic anhydride, 1,2-cyclohexanedicarboxylic acid and maleic anhydride-modified polypropylene; dicarboxylic acids such as fumaric acid, phthalic acid, maleic acid, trimellitic acid and himic acid; diols such as 1,3'-butanediol, 1,4'-butanediol, hydroquinonedihydroxydiethyl ether and tricyclodecane-dimethanol; triols such as 1,1,1-trimethylolpropane; polyhydric phenols such as phenol novolak resins and cresol novolak resin; polyamides such as nylon 6, nylon 66, nylon 610, nylon 11, nylon 612, nylon 12, nylon 46, methoxymethylated polyamides, polyhexamethylenediamine terephthalamide and polyhexamethylene isophthalamide; and diisocyanates such as hexamethylene diisocyanate and toluylene diisocyanate.

These hardening agents may be used either singly or in any combination thereof. A proportion of the hardening agent incorporated is generally 0.1 to 50 parts by weight, preferably 1 to 40 parts by weight, more preferably 2 to 30 parts by weight per 100 parts by weight of the alicyclic structure-containing resin having the polar group.

4. Hardening Accelerator and Hardening Aid

In the present invention, a hardening accelerator and a hardening aid may be used to more enhance the curability of the resin composition comprising the alicyclic structure-containing resin having the polar group, soft polymer and hardening agent.

Examples of the hardening accelerator include amines such as pyridine, benzyldimethylamine, triethanolamine, triethylamine, tributylamine, tribenzylamine, dimethylformamide and imidazoles. These hardening accelerators may be used either singly or in any combination thereof. A proportion of the hardening accelerator blended is generally 0.1 to 30 parts by weight, preferably 1 to 20 parts by weight per 100 parts by weight of the alicyclic structure-containing resin having the polar group.

No particular limitation is imposed on the hardening aid. Publicly known compounds disclosed in Japanese Patent Application Laid-Open No. 34924/1987 and the like may be used. Examples thereof include oxime nitroso type hardening aids such as quinone dioxime, benzoquinone dioxime and p-nitrosophenol; maleimide type hardening aids such as N,N-m-phenylenebismaleimide; allyl type hardening aids such as diallyl phthalate, triallyl cyanurate and triallyl isocyanurate; methacrylate type hardening aids such as ethylene glycol dimethacrylate and trimethylolpropane trimethacrylate; and vinyl type hardening aids such as vinyltoluene, ethylvinylbenzene and divinylbenzene. These hardening aids may be used either singly or in any combination thereof. A proportion of the hardening aid blended is generally 1 to 1,000 parts by weight, preferably 10 to 500 parts by weight per 100 parts by weight of the hardening agent.

5. Other Compounding Additives:

Other compounding additives include fillers, flame retardants, heat stabilizers, weathering stabilizers, leveling agents, lubricants, etc. These compounding additives may be used in desired amount according to the respective functions thereof.

When a filler is incorporated into the resin composition according to the present invention, it is possible to improve the mechanical strength (toughness), and reduce coefficient of linear expansion, thereby further enhancing the adhesion strength. Examples of the filler include inorganic and organic fillers.

No particular limitation is imposed on the inorganic fillers. Examples thereof include calcium carbonate (precipitated calcium carbonate, heavy or pulverized calcium, special calcium type fillers), clay (aluminum silicate; fine nepheline syenite powder, calcined clay, silane-modified clay), talc, silica, alumina, dolomite, diatomaceous earth, quartz sand, pumice powder, pumice balloons, slate powder, mica powder, asbestos, alumina colloid (alumina sol), alumina white, aluminum sulfate, barium sulfate, lithopone, calcium sulfate, molybdenum disulfide, graphite, glass fiber, glass beads, glass flake, foamed glass beads, fly ash beads, volcanic glass balloons, synthetic fiber balloons, monocrystalline potassium titanate, carbon fiber, carbon balloons, anthracite culm, artificial cryolite, titanium oxide, magnesium oxide, basic magnesium carbonate, dowamite, potassium titanate, calcium sulfite, mica, asbestos, calcium silicate, montmorillonite, bentonite, graphite, aluminum powder, molybdenum sulfide, boron fiber and silicon carbide fiber.

Examples of the organic fillers include polyethylene fiber, polypropylene fiber, polyester fiber, polyamide fiber, fluorocarbon fiber, ebonite powder, thermosetting resin balloons, sarab balloons, shellac, wood flour, cork powder, polyvinyl alcohol fiber, cellulose powder and wood pulp.

The filler may have conductivity when electronic parts are bonded and electrically connected to each other in particular. As examples of the filler having conductivity, may be mentioned conductive particles. More specifically, examples of the conductive particles include 1̂ particles of metals such as nickel, aluminum, silver, copper, tin, lead, gold, zinc, platinum, cobalt and alloys (foor example, solder) thereof, 2̂ aggregated metal particles, 3̂ molten metal particles, 4̂ conductive carbon particles such as conductive carbon black and carbon monofilament, 5̂ metal-coated resin particles obtained by subjecting particles of a styrene, phenol or epoxy resin, or composite partidles of any of these resin particles and solder or the like to a metal-plating treatment such as Ni- or Au-plating, 6̂ composite resin particles combined by dispersing metal particles in a flexible resin such as a polyurethane resin, and 7̂ microcapsulated conductive particles. A resin composition containing such conductive particles has anisotropic conductivity. Therefore, xwhen it is used as a coating film or sheet, the conductivity can be imparted i n a bonding direction (thickness-wicse direction). However, the insulating property is retained in a direction (lateral direction) perpendicular thereto.

6. Insulating Material for Electronic Part

The resin composition according to the present invention is useful as an insulating material for precision electro nic p arts. The form of the resin composition used as an insulating material insulating material may be suitably selected as necessary in the end application intended. When it is used in adhesion on an irregular surface in a circuit board, semiconductor chip or the like, however, it is preferably used in the form of a varnish (liquid composition) or a sheet. More specifically, in order to use the resin composition according to the present invention as an insulating material, there are forms such as a method in which a varnish (organic solvent solution) is applied to a substrate and dried to form a coating film and a method in which a sheet is formed in advance to use it.

(1) Varnish:

The varnish according to the present invention is prepared by dissolving or dispersing the respective components making up the alicyclic structure-containing resin composition in an organic solvent.

No particular limitation is imposed on the organic solvent so far as it can dissolve or disperse the respective components therein. However, examples thereof include aromatic hydrocarbons such as toluene, xylene and ethylbenzene; aliphatic hydrocarbons such as n-pentane, hexane and heptane; alicyclic hydrocarbons such as cyclohexane; halogenated hydrocarbons such as chlorobenzene, dichlorobenzene and trichlorobenzene; ketones such as methyl ethyl ketone, 2-pentanone and cyclohexanone; ethers; and alcohols. These organic solvent may be used either singly or in any combination thereof.

The organic solvent may be used in an amount sufficient to uniformly dissolve or disperse the alicyclic structure-containing resin, the soft polymer and the other components optionally contained therein. However, the organic solvent is used within such a range that a solids concentration amounts to generally 1 to 80 wt. %, preferably 5 to 60 wt. %, more preferably 10 to 50 wt. %.

(2) Sheet:

The sheet according to the present invention can be obtained by forming the alicyclic structure-containing resin composition in the form of a sheet.

The formation of the sheet may be conducted in accordance with a method known per se in the art, and examples thereof include a process in which the varnish is coated on a smooth surface of a planished metal plate, carrier film made of a resin, or the like, and a solvent is then dried, and a process in which the resin composition according to the present invention is melt-extruded through a T-die.

The thickness of the sheet according to the present invention is suitably selected as necessary for the end application intended. However, it is generally 1 to 1,000 $\mu$m, preferably 5 to 500 $\mu$m, more preferably 10 to 100 $\mu$m. When the thickness of the sheet falls within the above range, the adhesion property and long-term reliability are balanced with each other at a high level. It is hence preferable to control the thickness within such a range.

(3) Insulating Film:

When the resin composition according to the present invention is used as a varnish, the varnish is coated on a substrate, on which wiring has been formed, such as, for example, a glass epoxy substrate, ceramic substrate or silicon wafer substrate by means of a spin coater, roll coater or the like, and the solvent is removed to form an insulating coating film.

When the resin composition according to the present invention is used as a sheet, the sheet is fusion-bonded to the above-described substrate by heating and pressing it or bonded thereto using an adhesive as needed, thereby forming an insulating film.

Examples of electronic parts, to which the resin composition according to the present invention is applied as an insulating material, include wiring boards (for example, printed circuit boards such a multi-layer interconnection boards, high-density assembly boards and flexible printed boards, silicon wafer substrates, and ceramic substrates) in which wiring, electrodes and the like made of metallic conductors are formed on a substrate formed of an organic material or inorganic material, central processing units (CPU), semiconductor devices such as IC chips such as semiconductor memories (DRAM), and LSI chips, and semiconductor packages such as ball grid arrays (BGA) and chip size packages (CSP).

EXAMPLES

The present invention will hereinafter be described more specifically by the following Examples and Comparative Examples.

(1) The glass transition temperature was measured in accordance with the differential scanning calorimetry (DSC method).

(2) The molecular weight was determined in terms of polystyrene as measured by gel permeation chromatography (GPC) using tetrahydrofuran as a solvent unless expressly noted.

(3) The copolymerization ratio was determined by $^1$H-NMR.

(4) The epoxy group content was determined by $^1$H-NMR.

(5) The carboxyl group content was determined by $^1$H-NMR.

(6) A pressure cooker test (PCT) was conducted by observing changes in properties of a sample for 20 hours under conditions of 160° C. and 4 atm. As a result of the reliability test at this high temperature, a sample on which deformation, cracking and/or the like has occurred was evaluated as a failure, and the failure rate thereof was determined.

(7) A thermal cycle test (TCT) was conducted by repeating a temperature cycle of "−55° C. (30 min)→room temperature (5min)→160° C. (30 min)→room temperature (5 min)" 500 times to apply temperature shock to a test sample, thereby investigating whether cracking occurred or not. Since a sample on which deformation, cracking and/or the like has occurred in this thermal cycle test was evaluated as a failure, the failure rate thereof was determined.

(8) The resistance to solvent cracking was determined by forming a coating film on a substrate and dropping droplets of toluene on the coating film, thereby observing whether cracking occurred or not.

Synthesis Example 1

A 1-liter flask purged with nitrogen was charged with 5 g of 8-ethyltetracyclo-[4.4.0.1$^{2.5}$.1$^{7.10}$]dodec-3-ene (i.e., 6-ethyl-1,4:5,8-dimethano-1,4,4a,5,6,7,8,8a-octahydronaphthalene; hereinafter referred to as "ETD") and 120 g of toluene, followed by addition of 0.287 mmol of truisobutylaluminum and 0.287 mmol of isobutyl alcohol as polymerization catalysts, and 3.83 mmol of 1-hexene as a molecular weight modifier. To the mixture, 0.057 mmol of tungsten hexachloride was added, and stirring was conducted at 40° C. for 5 minutes. Thereafter, 45 g of ETD and 0.086 mmol of tungsten hexachloride were continuously added dropwise to the reaction system over about 30 minutes. After completion of the addition, stirring was continued for additional 30 minutes to complete ring-opening polymerization.

This polymerization reaction mixture obtained above was transferred to a 1-liter autoclave, and 160 g of toluene were added thereto. After a mixture of 0.5 g of nickel acetylacetonate and 5.15 g of a 30 wt. % toluene solution of triisobutylaluminum was then added, and the interior of the autoclave was purged with hydrogen, the contents were heated to 80° C. with stirring. The hydrogen pressure was raised to 30 kg/cm$^2$ at the time the temperature was stable, thereby conducting a reaction for 3 hours while supplying hydrogen consumed in the course of the reaction. Then, 4.2 g of water and 2.5 g of activated alumina (specific surface area: 320 cm$^2$/g; pore volume: 0.8 cm$^3$/g; average particle size: 15 $\mu$m; Neobead D powder, product of Mizusawa Industrial Chemicals, Inc.) were added to the reaction mixture, followed by stirring at 80° C. for 1 hour. Solids were then separated by filtration, and the resultant hydrogenation reaction mixture was poured into 3 liters of isopropyl alcohol to deposit a resin formed. The resin was collected by filtration and then dried for 48 hours at 100° C. under reduced pressure of 1 Torr or lower.

The thus-obtained hydrogenated resin had a rate of hydrogenation of ≧99%, Tg of 138° C., Mn of 18,000 and Mw of 31,600.

Synthesis Example 2
Synthesis of Modified Resin (A)

Into 100 parts by weight of the hydrogenated resin obtained in Synthesis Example 1, were mixed 18 parts by weight of maleic anhydride, 0.05 parts by weight of dicumyl peroxide and 200 parts by weight of tert-butyl-benzene to conduct a reaction at 135° C. for 2 hours in an autoclave. After the reaction, the reaction mixture was poured into a great amount of isopropyl alcohol to deposit a resin formed. The resin was separated by filtration to collect a modified resin. The collected modified resin was dried for 48 hours at 100° C. under reduced pressure of 1 Torr or lower. After this manner, 105 parts by weight of Maleic Anhydride-Modified Resin (A) were obtained.

The physical properties of Maleic Anhydride-Modified Resin (A) were determined. As a result, this resin was found to have Tg of 150° C., Mn of 22,100 and Mw of 49,500. The modification rate with maleic anhydride (polar group content) in Maleic Anhydride-Modified Resin (A) was 26 mol % as determined by $^1$H-NMR.

Synthesis Example 3
Synthesis of Modified Resin (B)

Into 100 parts by weight of the hydrogenated resin obtained in Synthesis Example 1, were mixed 18 parts by weight of allyl glycidyl ether, 0.04 parts by weight of dicumyl peroxide and 200 parts by weight of tert-butylbenzene to conduct a reaction at 135° C. for 2 hours in an autoclave. After the reaction, the reaction mixture was poured into a great amount of isopropyl alcohol to deposit a resin formed. The resin was separated by filtration to collect a modified resin. The collected modified resin was dried for 48 hours at 100° C. under reduced pressure of 1 Torr or lower. After this manner, 101 parts by weight of Allyl Glycidyl Ether-Modified Resin (B) were obtained.

The physical properties of Allyl Glycidyl Ether-Modified Resin (B) were determined. As a result, this resin was found to have Tg of 147° C., Mn of 18,300 and Mw of 46,100. The modification rate with allyl glycidyl ether (polar group content) in Allyl Glycidyl Ether-Modified Resin (B) was 15 mol % as determined by $^1$H-NMR.

Synthesis Example 4
Synthesis of Modified Resin (C)

Into 100 parts by weight of the hydrogenated resin obtained in Synthesis Example 1, were mixed 3.5 parts by weight of maleic anhydride, 0.01 parts by weight of dicumyl peroxide and 200 parts by weight of tert-butylbenzene to conduct a reaction at 135° C. for 2 hours in an autoclave. After the reaction, the reaction mixture was poured into a great amount of isoprpyl alcohol to deposit a resin formed. The resin was separated by filtration to collect a modified resin. The collected modified resin was dried for 48 hours at 100° C. under reduced pressure of 1 Torr or lower. After this manner, 100 parts by weight of Maleic Anhydride-Modified Resin (C) were obtained.

The physical properties of Maleic Anhydride-Modified Resin (C) were determined. As a result, this resin was found to have Tg of 139° C., Mn of 19,200 and Mw of 38,400. The modification rate with maleic anhydride (polar group content) in Maleic Anhydride-Modified Resin (C) was 5 mol % as determined by $^1$H-NMR.

Synthesis Example 5
Synthesis of Modified Resin (D)

Into 100 parts by weight of the hydrogenated resin obtained in Synthesis Example 1, were mixed 40 parts by weight of maleic anhydride, 0.1 parts by weight of dicumyl peroxide and 200 parts by weight of tert-butyl-benzene to conduct a reaction at 135° C. for 2 hours in an autoclave. After the reaction, the reaction mixture was poured into a great amount of isopropyl alcohol to deposit a resin formed. The resin was separated by filtration to collect a modified resin. The collected-modified resin was dried for 48 hours at 100° C. under reduced pressure of 1 Torr or lower. After this manner, 115 parts by weight of Maleic Anhydride-Modified Resin (D) were obtained.

The physical properties of Maleic Anhydride-Modified .Resin (D) were determined. As a result, this resin was found to have Tg of 158° C., Mn of 23,400 and Mw of 53,200. The modification rate with maleic anhydride (polar group content) in Maleic Anhydride-Modified Resin (A) was 45 mol % as determined by $^1$H-NMR.

Synthesis Example 6
Synthesis of Modified Resin (E)

An addition copolymer [NB content: 52 mol %; Mn=68,200, Mw=140,100; Tg=154° C.] of norbornene (NB) and ethylene was obtained in accordance with the publicly known process described in Japanese Patent Application Laid-Open No. 45612/1991.

Dissolved in 130 parts by weight of t-butylbenzene were 30 parts by weight of the thus-obtained norbornene-ethylene copolymer, 10 parts by weight of 5,6-epoxy-1-hexene and 2 parts of dicumyl peroxide, and a reaction was conducted at 140° C. for 6 hours. The resultant reaction mixture was poured into 300 parts by weight of methanol to solidify a reaction product. The reaction product thus solidified was dried under reduced pressure at 100° C. for 20 hours, thereby obtaining 29 parts by weight of Epoxy-Modified Resin (E).

The physical properties of Epoxy-Mo dified Resin (E) were determined. As a result, this resin was found to have Tg of 155° C., Mn of 72,400 and Mw of 152,300. The maleic anhydride content in Epoxy-Modified Resin (E) was 0.5 mol % based on the whole repeating structural unit of the polymer as determined by $^1$H-NMR.

Synthesis Example 7
Synthesis of Polar Group-Containing Resin (F)

A hydrogenated product of a ring-opening polymer of 8-methyl-8-carboxymethyltetracyclo[4.4.0.1$^{3,5}$.1$^{7,10}$]dodec-3-ene was obtained in accordance with the publicly known process described in Japanese Patent Application Laid-Open No. 72558/1991. This hydrogenated ring-opening polymer is a polar group-containing resin having a polar group in a proportion of 100 mol % based on the whole repeating structure unit in the polymer.

The physical properties of Polar Group-Containing Resin (F) were determined. As a result, this resin was found to have Tg of 168° C., Mn of 8,900 and Mw of 24,100.

Example 1

In a mixed solvent of 52 parts by weight of xylene and 13 parts by weight of cyclohexanone, were dissolved 35 parts by weight of Maleic Anhydride-Modified Resin (A) obtained in Synthesis Example 2 and 3.5 parts by weight of a maleic acid-modified, hydrogenated styrene.butadiene.styrene terpolymer (modification rate with maleic acid=1.3%; hereinafter referred to as "maleylated SEBS") as a soft polymer. α,α'-Bis(4-aminophenyl)-1,3-diisopropyl-benzene was then added as a hardening agent so as to amount to 3.5 parts by weight, thereby uniformly dissolving it. The solution was filtered through a porous tetrafluoroethylene filter having a pore size of 0.22 μm to obtain a uniform solution.

The solution obtained above was coated on a glass-epoxy multi-layer substrate of 4 layers having a thickness of 0.6 mm, on which wiring had been formed, by means of a spin coater, and the substrate was then heated at 110° C. for 20 minutes and then at 150° C. for 10 minutes to dry and remove the solvent. Thereafter, the substrate was heated at 250° C. for 3 hours to form a cured coating film having a thickness of 60 µm. The dielectric constant and dielectric loss tangent of this coating film both showed good low values.

When droplets of toluene were dropped on the coating film of this substrate, no occurrence of cracking was observed. When the substrate, on which the coating film had been formed, was used to conduct reliability tests by PCT and TCT, the failure rates in PCT and TCT were both 0%.

Example 2

In a mixed solvent of 52 parts by weight of xylene and 13 parts by weight of cyclohexanone, were dissolved 35 parts by weight of Allyl Glycidyl Ether-Modified Resin (B) obtained in Synthesis Example 3 and 3.5 parts by weight of a maleylated SEBS (polar group-containing soft polymer). $\alpha,\alpha'$-Bis(4-aminophenyl)-1,3-diisopropylbenzene was then added as a hardening agent so as to amount to 3.5 parts by weight, thereby uniformly dissolving it. The solution was filtered through a porous tetrafluoroethylene filter having a pore size of 0.22 µm to obtain a uniform solution.

The solution obtained above was coated on a glass-epoxy multi-layer substrate of 4 layers having a thickness of 0.6 mm, on which wiring had been formed, by means of a spin coater, and the substrate was then heated at 110° C. for 20 minutes and then at 150° C. for 10 minutes to dry and remove the solvent. Thereafter, the substrate was heated at 250° C. for 3 hours to form a cured coating film having a thickness of 60 µm. The dielectric constant and dielectric loss tangent of this coating film both showed good low values.

When droplets of toluene were dropped on the coating film of this substrate, no occurrence of cracking was observed. When the substrate, on which the coating film had been formed, was used to conduct reliability tests by PCT and TCT, the failure rates in PCT and TCT were both 0%.

Example 3

In a mixed solvent of 52 parts by weight of xylene and 13 parts by weight of cyclohexanone, were dissolved 35 parts by weight of Maleic Anhydride-Modified Resin (C) obtained in Synthesis Example 4 and 3.5 parts by weight of a maleylated SEBS (polar group-containing soft polymer). $\alpha,\alpha'$-Bis(4-aminophenyl)-1,3-diisopropylbenzene was then added as a hardening agent so as to amount to 1.0 part by weight, thereby uniformly dissolving it. The solution was filtered through a porous tetrafluoroethylene filter having a pore size of 0.22 µm to obtain a uniform solution.

The solution obtained above was coated on a glass-epoxy multi-layer substrate of 4 layers having a thickness of 0.6 mm, on which wiring had been formed, by means of a spin coater, and the substrate was then heated at 110° C. for 20 minutes and then at 150° C. for 10 minutes to dry and remove the solvent. Thereafter, the substrate was heated at 250° C. for 3 hours to form a cured coating film having a thickness of 60 µm. The dielectric constant and dielectric loss tangent of this coating film both showed good low values.

When droplets of toluene were dropped on the coating film of this substrate, occurrence of cracking was partially observed. However, it was such that did not offer a great problem from the viewpoint of practical use. When the substrate, on which the coating film had been formed, was used to conduct reliability tests by PCT and TCT, the failure rates in PCT and TCT were both at most 5%.

Example 4

In a mixed solvent of 52 parts by weight of xylene and 21 parts by weight of cyclohexanone, were dissolved 35 parts by weight of Maleic Anhydride-Modified Resin (D) obtained in Synthesis Example 5 and 5.2 parts by weight of a maleylated SEBS (soft polymer). $\alpha,\alpha'$-Bis(4-aminophenyl)-1,3-diisopropylbenzene was then added as a hardening agent so as to amount to 4.1 parts by weight, thereby uniformly dissolving it. The solution was filtered through a porous tetrafluoroethylene filter having a pore size of 0.22 µm to obtain a uniform solution.

The solution obtained above was coated on a glass-epoxy multi-layer substrate of 4 layers having a thickness of 0.6 mm, on which wiring had been formed, by means of a spin coater, and the substrate was then heated at 110° C. for 20 minutes and then at 150° C. for 10 minutes to dry and remove the solvent. Thereafter, the substrate was heated at 250° C. for 3 hours to form a cured coating film having a thickness of 63 µm. The dielectric constant and dielectric loss tangent of this coating film both showed good low values.

When droplets of toluene were dropped on the coating film of this substrate, no occurrence of cracking was observed. When the substrate, on which the coating film had been formed, was used to conduct reliability tests by PCT and TCT, the failure rates in PCT and TCT were both 0%.

Comparative Example 1

A coating film having a thickness of 60 µm was formed on a glass-epoxy substrate in the same manner as in Example 1 except that no maleylated SEBS was added.

When droplets of toluene were dropped on the coating film of this substrate, a great number of fine cracks occurred. Even in respective reliability tests by PCT and TCT, a great number of fine cracks was observed occurring.

Comparative Example 2

In a similar manner to Example 1 except that Epoxy-Modified Resin (E) obtained in Synthesis Example 6 was used in place of Maleic Anhydride-Modified Resin (A), this Epoxy-Modified Resin (E) and a maleylated SEBS were dissolved in the mixed solvent of xylene and cyclohexanone. As a result, the solution underwent phase separation into 2 layers. When the resultant solution was coated on a glass-epoxy substrate, Epoxy-Modified Resin (E) and the maleylated SEBS were separated from each other to cause countless cracks in the coating film portion of EpoxyModified Resin (E).

Comparative Example 3

A cured coating film having a thickness of 60 µm was formed on a glass-epoxy substrate in the same manner as in Example 1 except that Polar Group-Containing Resin (F) obtained in Synthesis Example 7 was used in place of Maleic Anhydride-Modified Resin (A).

When droplets of toluene were dropped on the coating film of this substrate, countless cracks occurred. Even in TCT, a great number of cracks occurred.

As apparent from the results in Examples 1 to 4 and Comparative Examples 1 to 3, the resistance to solvent cracking and resistance to cracking in PCT and TCT are markedly lowered when no soft polymer was incorporated (Comparative Example 1), or the content of the polar group did not fall within a proper range (Comparative Examples 2 and 3). On the other hand; the resin compositions according to the present invention are excellent in adhesion property to substrates and the like and also in resistance to solvent cracking and resistance to cracking. When the resins containing the polar group in a high proportion are used (Examples 1, 2 and 4), these properties become far excellent.

INDUSTRIAL APPLICABILITY

According to the present invention, there can be provided resin compositions which are excellent in heat resistance, dielectric properties, adhesion property (adhesive property), etc., and also in resistance to solvent cracking and resistance to cracking in reliability tests such as pressure cooker test and thermal cycle test, and suitable for use as insulating materials for electronic parts. The resin compositions according to the present invention can be suitably used as insulating materials in the field of electronics mounting techniques. The resin compositions according to the present invention can be suitably applied to fields of, for example, adhesion junction of electronic parts to wiring boards, sealing and insulation of electronic parts, adhesion between boards (substrates), interlayer insulating films, shipment of electronic parts, etc.

What is claimed is:

1. An alicyclic structure-containing resin composition comprising an alicyclic structure-containing resin (A) having a polar group which comprises a hetero atom or a hetero atom-containing atomic group wherein said hetero atom is oxygen atom or nitrogen atom in a proportion of 3 to 50 mol % based on the whole repeating unit in the resin, a polymer (B) having a glass transition temperature of at most 30° C., and a hardening agent (C) which forms an ion by heat or light.

2. The alicyclic structure-containing resin composition according to claim 1, which is an insulating material for electronic parts.

3. The alicyclic structure-containing resin composition according to claim 1, wherein the alicyclic structure-containing resin (A) having the polar group has a glass transition temperature of at least 50° C.

4. The alicyclic structure-containing resin composition according to claim 1, wherein the alicyclic structure-containing resin (A) having the polar group is that obtained by introducing the polar group into an alicyclic structure-containing resin selected from the group consisting of (1) thermoplastic norbornene resins, (2) monocyclic cycloolefin polymers, (3) cyclic conjugated diene polymers and (4) vinyl alicyclic hydrocarbon polymers.

5. The alicyclic structure-containing resin composition according to claim 4, wherein the thermoplastic norbornene resin, in which the polar group has been introduced, is that obtained by introducing the polar group into a thermoplastic norbornene resin selected from the group consisting of (i) ring-opening (co)polymers of norbornene monomer(s) or hydrogenated products thereof, (ii) addition (co)polymers of norbornene monomer(s) or hydrogenated products thereof, and (iii) addition copolymers of a norbornene monomer and a vinyl compound or hydrogenated products thereof.

6. The alicyclic structure-containing resin composition according to claim 4, wherein the thermoplastic norbornene resin, in which the polar group has been introduced, is a graft-modified product obtained by graft-reacting a polar group-containing unsaturated compound-with the thermoplastic norbornene resin.

7. The alicyclic structure-containing resin composition according to claim 6, wherein the polar group-containing unsaturated compound is an unsaturated epoxy compound, unsaturated carboxylic compound, unsaturated carboxylic anhydride compound, unsaturated ester compound, unsaturated alcohol compound or unsaturated silane compound.

8. The alicyclic structure-containing resin composition according to claim 1, wherein the polymer (B) is at least one selected from the group consisting of (a) olefin-based polymers, (b) isobutylene-based polymers, (c) diene-based polymers, (d) cycloolefin-based polymers, (e) organosiloxyane polymers, (f) α,β-unsaturated acid derivative-based polymers, (g) unsaturated alcohol derivative-based polymers, (h) epoxy compound-based polymers, and (i) natural polymers.

9. The alicyclic structure-containing resin composition according to claim 1, wherein the polymer (B) is at least one selected from the group consisting of (a) olefin-based polymers, (b) isobutylene-based polymers, and (c) diene-based polymers, and has an aromatic vinyl monomer unit in a repeating unit of the polymer.

10. The alicyclic structure-containing resin composition according to claim 9, wherein the polymer (B) having the aromatic vinyl monomer unit in the repeating unit of the polymer is an ethylene-propylene-styrene random terpolymer, an isobutylene-styrene random copolymer or a hydrogenated product of these random copolymers, or a butadiene-styrene block copolymer, a styrene-butadiene-styrene block copolymer, an isoprene-styrene block copolymer, a styrene-isoprene-styrene block copolymer or a hydrogenated product of these block copolymers.

11. The alicyclic structure-containing resin composition according to claim 1, wherein the polymer (B) has a polar group introduced by a modification reaction.

12. The alicyclic structure-containing resin composition according to claim 11, wherein the polymer (B) having the polar group is a maleic acid-modified product of the polymer (B) having an aromatic vinyl monomer unit in the repeating unit of the polymer.

13. The alicyclic structure-containing resin composition according to claim 1, which contains the polymer (B) in a proportion of 1 to 30 parts by weight per 100 parts by weight of the alicyclic structure-containing resin (A).

14. The alicyclic structure-containing resin composition according to claim 1, which contains the hardening agent (C) in a proportion of 2 to 30 parts by weight per 100 parts by weight of the alicyclic structure-containing resin (A).

15. A varnish comprising an alicyclic structure-containing resin (A) having a polar group which comprises a hetero atom or a hetero atom-containing atomic group wherein said hetero atom is oxygen atom or nitrogen atom in a proportion of 3 to 50 mol % based on the whole repeating unit in the resin, a polymer (B) having a glass transition temperature of at most 30° C., a hardening agent (C) which forms an ion by heat or light and an organic solvent.

16. A sheet formed of an alicyclic structure-containing resin composition comprising an alicyclic structure-containing resin (A) having a polar group which comprises a hetero atom or a hetero atom-containing atomic group wherein said hetero atom is oxygen atom or nitrogen atom in a proportion of 3 to 50 mol % based on the whole repeating unit in the resin, a polymer (B) having a glass transition temperature of at most 30° C., and a hardening agent (C) which forms an ion by heat or light.

17. An insulating film formed of an alicyclic structure-containing resin composition comprising an alicyclic structure-containing resin (A) having a polar group which comprises a hetero atom or a hetero atom-containing atomic group wherein said hetero atom is oxygen atom or nitrogen atom in a proportion of 3 to 50 mol % based on the whole repeating unit in the resin, a polymer (B) having a glass transition temperature of at most 30° C., and a hardening agent (C) which forms an ion by heat or light.

18. An alicyclic structure-containing resin composition comprising an alicyclic structure-containing resin (A) having a polar group which comprises a hetero atom or a hetero atom-containing atomic group wherein said hetero atom is oxygen atom or nitrogen atom in a proportion of 3 to 50 mol % based on the whole repeating unit in the resin, a polymer (B) having a glass transition temperature of at most 30° C. and a hardening agent (C) selected from the group consisting of aliphatic polyamines, alicyclic polyamines, aromatic polyamines, bisazides, acid anhydrides, dicarboxylic acids, diols, triols, polyhydric phenols, polyamides, diisocyanates, and combinations thereof.

* * * * *